United States Patent [19]

Iguchi et al.

[11] Patent Number: 5,464,493
[45] Date of Patent: Nov. 7, 1995

[54] THERMOPLASTIC COMPOSITE FABRICS AND FORMED ARTICLE PRODUCED THEREFROM

[75] Inventors: Masaru Iguchi, Kawaguchi; Hiromasa Shigeta, Shiki; Keizo Matsumoto, Iruma, all of Japan

[73] Assignee: Honda Giken Kogyo Kabushiki Kaisha, Tokyo, Japan

[21] Appl. No.: 289,562

[22] Filed: Aug. 12, 1994

Related U.S. Application Data

[62] Division of Ser. No. 944,091, Sep. 11, 1992, Pat. No. 5,418,035.

[30] Foreign Application Priority Data

| Sep. 12, 1991 | [JP] | Japan | 3-261030 |
| Jan. 10, 1992 | [JP] | Japan | 4-021802 |
| Jan. 10, 1992 | [JP] | Japan | 4-021960 |
| Jan. 10, 1992 | [JP] | Japan | 4-021972 |

[51] Int. Cl.$^6$ ............................................. B32B 31/04
[52] U.S. Cl. .......................... 156/290; 156/308.4; 428/119
[58] Field of Search ................... 156/73.1, 73.2, 156/73.4, 92, 290, 308.4; 264/23; 428/113, 196, 198, 119

[56] References Cited

U.S. PATENT DOCUMENTS

| 3,620,892 | 11/1971 | Wincklhofer et al. | 428/197 |
| 4,090,897 | 5/1978 | Minick | 156/73.1 |
| 4,647,325 | 3/1987 | Bach | 156/73.1 |
| 4,713,132 | 12/1987 | Abel et al. | 156/73.1 |
| 4,786,541 | 11/1988 | Nishimura et al. | 428/102 |
| 4,818,318 | 4/1989 | McMahon et al. | 156/166 |
| 4,842,922 | 6/1989 | Krupp et al. | 428/198 |
| 4,863,790 | 9/1989 | Horacek et al. | 428/285 |
| 4,913,861 | 4/1990 | Mishima et al. | 264/23 |
| 5,066,231 | 11/1991 | Oxman et al. | 433/214 |
| 5,182,839 | 2/1993 | Stuart | 28/283 |
| 5,227,236 | 7/1993 | Handermann | 428/361 |
| 5,246,520 | 9/1993 | Scanlon et al. | 156/245 |

FOREIGN PATENT DOCUMENTS 56-98260  8/1981  Japan.

OTHER PUBLICATIONS

Branson Ultrasonics Corp., Data Sheet 74-4, 1975.
Branson Ultrasonics Corp., Data Sheet PW-19, May 1980.

*Primary Examiner*—David A. Simmons
*Assistant Examiner*—J. Sells
*Attorney, Agent, or Firm*—Birch, Stewart, Kolasch & Birch

[57] ABSTRACT

An integrally formed article of thermoplastic composite members having a first member which is a preformed laminate of a plurality of thermoplastic composite fabrics comprising reinforcing fibers and a thermoplastic resin, and a second member which is a partially bonded laminate of a plurality of thermoplastic composite fabrics comprising reinforcing fibers and a thermoplastic resin, a not-bonded portion of the second member being bent, brought into contact with the first member, and heated at a temperature equal to or higher than a melting point of the thermoplastic resin under pressure so that the not-bonded portion of the second member is integrally bonded to the first member.

1 Claim, 7 Drawing Sheets

THERMOPLASTIC COMPOSITE FABRICS AND FORMED ARTICLE PRODUCED THEREFROM

This application is a divisional of application Ser. No. 07/944,091, filed on Sep. 11, 1992, Pat. No. 5,418,035, the entire contents of which are hereby incorporated by reference.

BACKGROUND OF THE INVENTION

The present invention relates to a thermoplastic composite member consisting essentially of a thermoplastic matrix resin and reinforcing fibers and having improved toughness, a thermoplastic composite fabric for producing such a thermoplastic composite member, an assembly of a bagging film and a seal member for the high-temperature forming of a thermoplastic composite member, a method of producing a thermoplastic composite member, a preform composed of a thermoplastic composite member and a method of producing such a preform without suffering from wrinkles, a formed article constituted by two or more thermoplastic composite members free from insufficient bonding between thermoplastic composite members, and a method of producing such a formed article.

Various composite members consisting essentially of various matrix resins and reinforcing fibers such as carbon fibers have been used as alternatives of metal members for many applications. Since composite members having matrix resins made of thermoplastic resins can easily be molded or formed, they are used for wide applications such as home electric appliances, machine parts, automobile parts, structural members, etc. Since thermoplastic composite members are excellent in mechanical strength with light weight, they may be used in many fields in which conventional resins are not satisfactory from the aspect of mechanical strength. Particularly, since polyether ether ketone (hereinafter referred to as "PEEK"), one of thermoplastic resins, has good mechanical strength, high elongation, etc. and can withstand large damage, it has been investigated to use this PEEK as a matrix resin for fiber-reinforced composite members in various machine parts such as automobile parts, structural members, etc.

A typical composite fabric consisting essentially of a matrix resin made of the PEEK resin and reinforcing fibers (reinforcing fibers/PEEK composite) is a sheet-like member obtained by weaving reinforcing fibers such as carbon fibers and fibers made of PEEK. The production of a formed article from these sheet-like fabrics is usually conducted by laminating a plurality of sheet-like fabrics and heating the resulting laminate under pressure, thereby melting the PEEK into an integral form.

Although a composite member consisting essentially of a PEEK matrix resin and reinforcing fibers shows good mechanical strength, it has been found to be somewhat poor in impact resistance, etc. To obviate this problem, it is necessary to improve the toughness of the composite member. For this purpose, it is preferable to use a high-molecular weight PEEK as a matrix resin. However, since the high-molecular weight PEEK has a large melt viscosity, the reinforcing fibers cannot be well impregnated with melted high-molecular weight PEEK in the composite fabrics. Therefore, in conventional composite fabrics of reinforcing fibers/PEEK fibers, low-molecular weight PEEK fibers are used to make sure that the reinforcing fibers are well impregnated with the PEEK.

When the low-molecular weight PEEK is used, the resulting composite member, particularly a matrix portion thereof, does not show highly improved toughness. Accordingly, the toughness of the conventional composite members formed by simply laminating composite fabrics consisting essentially of reinforcing fibers and PEEK fibers is not satisfactory for applications such as automobile parts, structural members, etc.

In the production of thermoplastic composite members from thermoplastic composite fabrics, uniform pressure should be applied to the thermoplastic composite fabrics which are kept in desired shapes while being in good contact with each other or with different members. To achieve this object, a laminate of the thermoplastic composite fabrics is placed on a base plate made of aluminum, etc., laying a heat-resistant seal member around the base plate, covering the laminate on the base plate with a heat-resistant film such as a polyimide film, a nylon film, etc. (bagging film) for conducting the high-temperature forming of the thermoplastic composite fabrics at 250° C. or higher, bonding the bagging film to the seal member, and then heating the laminate in the bagging film to produce an integral thermoplastic composite member.

Figure 6:
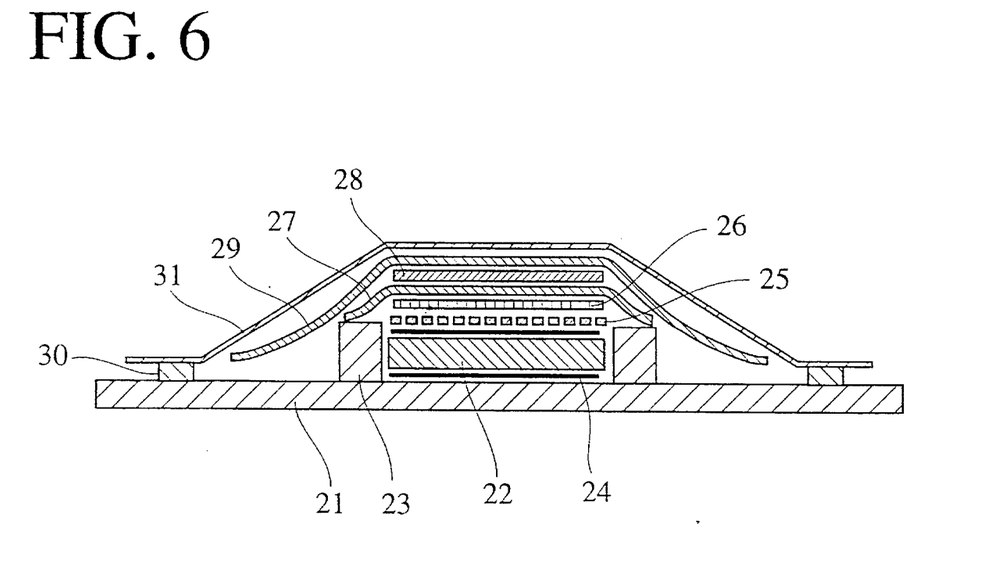
FIG. 6 is a cross-sectional view showing the bagging.

One example of such a bagging film is shown in FIG. 6. Placed on a base plate 21 made of aluminum, etc. is a laminate 22 of thermoplastic composite fabrics encircled by a frame 23. The laminate 22 is properly covered with a peel ply 24, a parting film 25 having apertures, a bleeder 26, a parting film 2-7; a press sheet 28 and a breather 29, if necessary. Placed outside the frame 23 is a heat-resistant seal member 30 for bonding the heat-resistant bagging film 31 to the base plate 21.

After bagging, the laminate 22 is heated under pressure to form an article having a desired shape. At this time, by evacuating the air from the heat-resistant bagging film 31 by a vacuum pump, it is possible to prevent the formed article from being deformed or from being hardened at different speeds from place to place, while removing small bubbles from the composite member.

However, since the beat-resistant bagging film 31 is rigid (poor in softness), and since the heat-resistant seal member 30 shows poor adhesion property at room temperature, the bonding operation of the seal member 30 to the bagging film 31 cannot be conducted efficiently. In addition, when the bagging film 31 is evacuated by a vacuum pump, leak is likely to take place particularly between the bagging film 31 and the seal member 30.

Apart from the above problems, it is generally difficult to bend a thermoplastic composite member composed of a plurality of thermoplastic composite fabrics without wrinkles in the process of forming, because a radius of curvature is different between fabrics near inside and those near outside. Accordingly, when bent articles are produced, sheet-like, thermoplastic composite fabrics to be laid outside should have larger lengths than those laid inside. According to this principle, the lengths of thermoplastic composite fabrics should increase gradually from inside to outside. The thermoplastic composite fabrics thus laminated on a mold or a jig are then heated under pressure to provide a bent article.

However, it is a laborious job to change the lengths of sheet-like, thermoplastic composite fabrics properly depending on the degree of bending.

Figure 14:
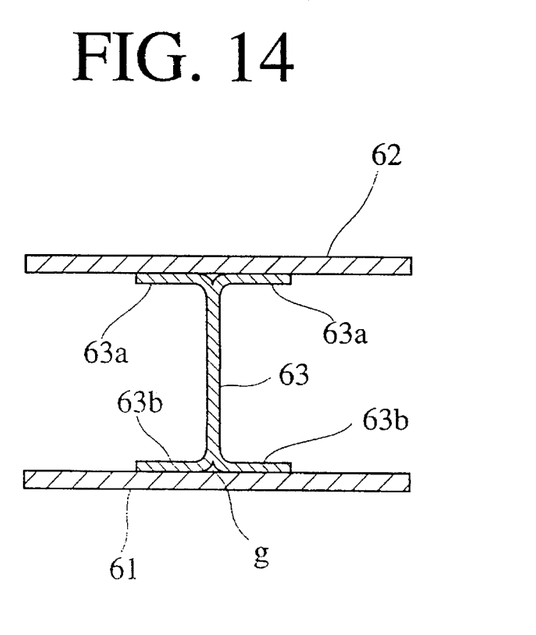
FIG. 14 is a cross-sectional view showing the conventional H-shaped article consisting of thermoplastic composite members for a structural member.

In addition to the above, in a case where such a thermoplastic composite member is used as a structural member, for instance, an H-shaped structural member as shown in FIG. 14, two flat thermoplastic composite members 61, 62 and one thermoplastic composite member 63 having both end portions 63a, 63a, 63b, 63b opened substantially perpendicularly are first prepared, and the opened end portions 63a, 63a, 63b, 63b of the thermoplastic composite member 63 are abutted and pressed onto the flat surfaces of the thermoplastic composite members 61, 62 while heating. However, for the same reason as mentioned above, the outside portions of the thermoplastic composite member 63 suffer from wrinkles after bending. Further, since the solidified thermoplastic composite members 61, 62 and the solidified thermoplastic composite member 63 are abutted, it is difficult to bend the thermoplastic composite member 63 completely perpendicularly, resulting in a bonded thermoplastic composite member with a slight gap in a center portion "g." In the process of heating and pressing, the gap portion "g" serves as a void or a resin-rich portion, whereby the resulting formed article shows insufficient strength in the gap portion "g."

It is possible to laminate a plurality of thermoplastic composite fabrics having gradually increasing lengths from inside to outside to avoid wrinkles after bending, but even with such thermoplastic composite fabrics, the gap "g" cannot be removed.

OBJECT AND SUMMARY OF THE INVENTION

Accordingly, an object of the present invention is to provide a thermoplastic composite member having improved toughness, which comprises a thermoplastic resin such as PEEK and reinforcing fibers.

Another object of tile present invention is to provide a thermoplastic composite fabric capable of providing such a thermoplastic composite member having improved toughness.

A further object of the present invention is to provide an assembly of a bagging film for the high-temperature forming of a thermoplastic composite member and a seal member, which makes it easier to conduct a bagging operation while preventing leak.

A still further object of the present invention is to provide a method of producing such an assembly of a bagging film for the high-temperature forming of a thermoplastic composite member and a seal member.

A still further object of the present invention is to provide a preform composed of a thermoplastic composite member which is a laminate of thermoplastic composite fabrics, which can be bent easily without wrinkles.

A still further object of the present invention is to provide a method of producing such a preform.

A still further object of the present invention is to provide an integrally formed article of thermoplastic composite members free from wrinkles and gap portions which serve as sites of small strength.

A still further object of the present invention is to provide a method of producing such an integrally formed article.

As a result of intense research in view of the above objects, the inventors have found that when a thermoplastic composite fabric for a composite member is produced from thermoplastic fibers for a matrix and reinforcing fibers, (i) the blend-weaving of reinforcing fibers, fibers made of a low-molecular weight thermoplastic resin, and fibers made of a high-molecular weight thermoplastic resin of the same type as that of the low-molecular weight thermoplastic resin, or (ii) the blend-weaving of reinforcing fibers and fibers melt-spun from a blend of a low-molecular weight thermoplastic resin and a high-molecular weight thermoplastic resin of the same type as that of the low-molecular weight thermoplastic resin can be used to provide a composite member having good toughness.

They have also found that although a heat-resistant sealant tape conventionally used for bagging shows good adhesion to a bagging film at a high temperature, it is poor in adhesion at room temperature, failing to achieve good sealing between the bagging film and the seal member, and that as a result, leak is likely to take place between the heat-resistant bagging film and the sealant tape. They have also found that by heating the seal member in advance while pressing it to a bagging film, both seal member and bagging film can be well adhered to each other, making it efficient to conduct the bagging operation with drastically decreased leak.

They have also found that when restricted portions of sheet-like, thermoplastic composite fabrics are bonded to each other in a laminate thereof, each sheet-like, thermoplastic composite fabric is easily slidable in the process of forming in which the laminate is bent, resulting in a bent preform without wrinkles.

They have also found that by using a partially bonded thermoplastic composite member with end portions opened substantially perpendicularly and pressing it to a flat thermoplastic composite member while heating at a temperature lower than the melting point of the thermoplastic resin so that the thermoplastic composite fabrics can slide to eliminate a gap portion from a bonding area, an integrally formed article free from the gap portion can be obtained.

The present invention has been completed based on these findings.

The first thermoplastic composite fabric according to the present invention comprises thermoplastic resin fibers and reinforcing fibers, the thermoplastic resin fibers consisting essentially of fibers made of a low-molecular weight thermoplastic resin and fibers made of a high-molecular weight thermoplastic resin.

The second thermoplastic composite fabric according to the present invention is constituted by weaving reinforcing fibers with fibers made of a melt-blended resin consisting essentially of a low-molecular weight thermoplastic resin and a high-molecular weight thermoplastic resin.

The thermoplastic composite member according to the present invention comprises a thermoplastic resin and reinforcing fibers, the thermoplastic composite member being formed from a laminate of the first thermoplastic composite fabrics by a thermal forming method.

The thermoplastic composite member according to the present invention comprises a thermoplastic resin and reinforcing fibers, the thermoplastic composite member being formed from a laminate of the second thermoplastic composite fabrics by a thermal forming method.

The assembly of a bagging film for high-temperature forming of a thermoplastic composite member according to the present invention comprises a seal member for bonding said bagging film to a base plate, the seal member being adhered to the bagging film by applying an energy to the seal member while compressing the seal member onto the bagging film.

The method of producing an assembly of a bagging film and a seal member according to the present invention comprises applying an energy to the seal member while compressing the seal member onto the bagging film.

The preform according to the present invention is composed of a bendable thermoplastic composite member which is a laminate of thermoplastic composite fabrics, the thermoplastic composite fabrics being bonded to each other in restricted portions.

The method of producing a preform composed of thermoplastic composite members according to the present invention comprises the steps of laminating a plurality of sheet-like, thermoplastic composite fabrics, and bonding them to each other in restricted portions.

The integrally formed article of thermoplastic composite members according to the present invention has a first member which is a preformed laminate of a plurality of thermoplastic composite fabrics comprising reinforcing fibers and a thermoplastic resin, and a second member which is a partially bonded laminate of a plurality of thermoplastic composite fabrics comprising reinforcing fibers and a thermoplastic resin, a not-bonded portion of the second member being bent, brought into contact with the first member, and heated at a temperature equal to or higher than a melting point of the thermoplastic resin under pressure so that the not-bonded portion of the second member is integrally bonded to the first member.

The method of producing an integrally formed article of thermoplastic composite members according to the present invention comprises the steps of:

(a) forming a preformed first member by laminating a plurality of thermoplastic composite fabrics comprising reinforcing fibers and a thermoplastic resin and applying pressure to the resulting laminate to form it into a predetermined shape while heating it at a temperature equal to or higher than a melting point of the thermoplastic resin;

(b) forming a second member by laminating a plurality of thermoplastic composite fabrics comprising reinforcing fibers and a thermoplastic resin and partially bonding the thermoplastic composite fabrics;

(c) bending a not-bonded portion of the second member;

(d) abutting and pressing the not-bonded portion of the second member to the first member while heating them at a temperature lower than the melting point of the thermoplastic resin; and (e) heating the resulting assembly at a temperature equal to or higher than a melting point of the thermoplastic resin under pressure.

DETAILED DESCRIPTION OF THE PREFERRED EMBODIMENTS

The present invention will be explained in detail below. Explanation will be made on carbon fibers as reinforcing fibers and PEEK as a thermoplastic resin, but it should be noted that the present invention is not restricted to the above combination. The other reinforcing fibers than carbon fibers usable in the present invention include aramide fibers, glass fibers, boron fibers, metal fibers, and other long reinforcing fibers commonly used for ordinary composite members. The other thermoplastic resins than PEEK usable in the present invention include polyamides such as nylons, polyesters such as polyethylene terephthalate and polybutylene terephthalate, polyacetal, polyphenylene sulfide, polyether ketone, etc. The reinforcing fibers may have diameters of 3–200 μm.

[ 1 ] Composite Fabric (1) First Embodiment

Figure 1:
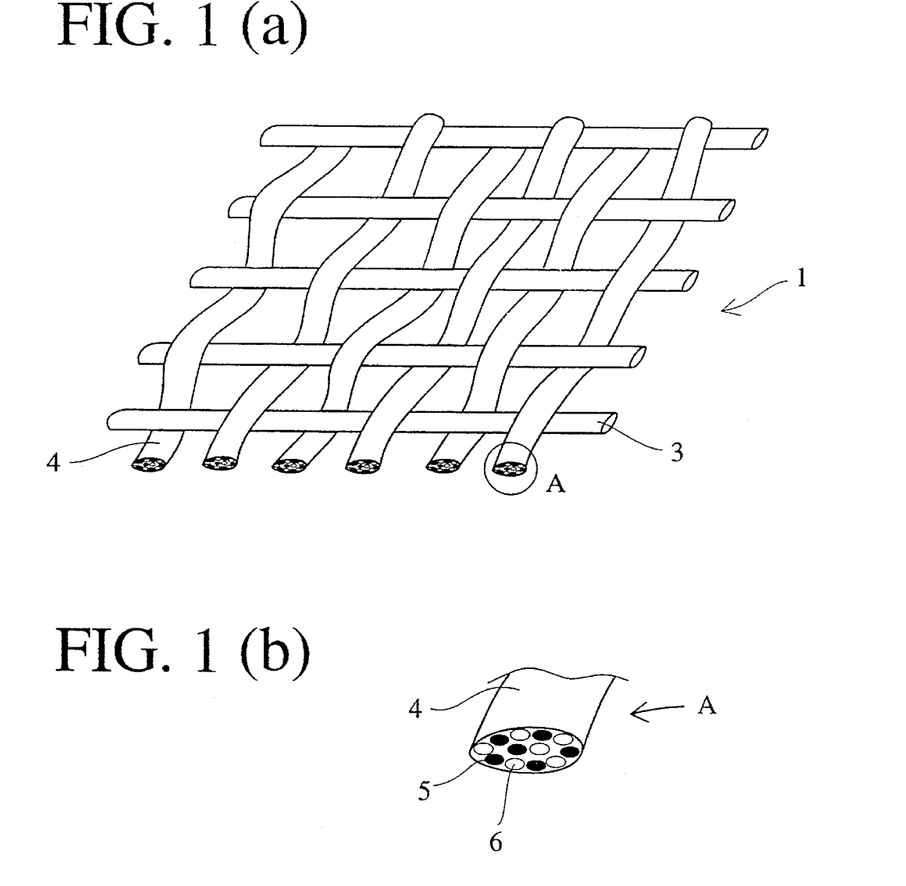
FIG. 1(a) is an enlarged schematic perspective view showing the first thermoplastic composite fabric according to the present invention.
FIG. 1(b) is an enlarged view of Section A of FIG. 1(a)

FIG. 1 shows the first embodiment of the present invention. A composite fabric 1 comprises (a) carbon fibers 3 and (b) strands 4 consisting essentially of fibers 5 made of low-molecular weight PEEK and fibers 6 made of high-molecular weight PEEK. Incidentally, although the composite fabric shown in FIG. 1 is in the form of a plain weave fabric, the composite fabric of the present invention is not restricted thereto, and any other fabrics such as satin, twill, etc. may be used.

The carbon fibers 3 as reinforcing fibers may be long reinforcing fibers usable for usual composite members. The carbon fibers may have diameters of about 3–20 μm. The carbon fibers 3 may be in the form of a monofilament or a twisted strand of fine carbon fibers.

The strands 4 is produced by twisting fibers 5 made of the low-molecular weight PEEK and fibers 6 made of the high-molecular weight PEEK. The low-molecular weight PEEK fibers 5 are preferably made of PEEK having a weight-average molecular weight of about $6.5 \times 10^4$ to about $8.3 \times 10^4$ (determined relative to the molecular weight of polystyrene as a reference). By using the fibers made of such a low-molecular weight PEEK resin, the reinforcing fibers are well impregnated with the low-molecular weight PEEK resin in the process of molding or forming, resulting in a composite member having a high mechanical strength.

The high-molecular weight PEEK fibers 6 are preferably made of PEEK having a weight-average molecular weight of about $9.0\times10^4$ to about $9.4\times10^4$. If the weight-average molecular weight of the high-molecular weight PEEK resin is lower than the lower limit of the above range, the resulting composite member would show insufficiently improved toughness. On the other hand, if the weight-average molecular weight of the high-molecular weight PEEK resin exceeds the upper limit of the above range, the high-molecular weight PEEK resin has too high a melt viscosity, resulting in poor formability of a composite member containing such high-molecular weight PEEK fibers.

Both the low-molecular weight PEEK fibers and the high-molecular weight PEEK fibers preferably have diameters of about 30–43 µm, and 108–150 of these fibers are preferably combined to form a single strand 4.

In the thermoplastic composite fabric 1, proportions of the low-molecular weight PEEK and the high-molecular weight PEEK are preferably such that the high-molecular weight PEEK constitutes 75 weight % or less of the total amount of the PEEK (the low-molecular weight PEEK constitutes 25 weight % or more of the total amount of the PEEK). When the proportion of the high-molecular weight PEEK exceeds 75 weight %, the resulting composite member cannot be easily molded or formed. More preferably, the proportion of the high-molecular weight PEEK relative to the total amount of the PEEK is 45–55 weight %.

The thermoplastic composite fabric of the present invention has been explained referring to FIG. 1, but the low-molecular weight PEEK fibers, the high-molecular weight PEEK fibers and the carbon fibers may be combined to form other types of fabrics. For instance, instead of the carbon fibers 3 as a weft in FIG. 1, blended yarns consisting essentially of the low-molecular weight PEEK fibers and/the high-molecular weight PEEK fibers and the carbon fibers may be used. In this case, other strands (corresponding to the strands of PEEK fibers as warp in FIG. 1) may be strands consisting essentially of the low-molecular weight PEEK fibers and the high-molecular weight PEEK fibers as in the case of the composite fabric 1 shown in FIG. 1, or may be strands consisting only of one type of the PEEK fibers.

In the above embodiments, the carbon fibers are unidirectional (UD) in the composite fabric, but the present invention is not restricted thereto. If necessary, carbon fibers may be arranged in both perpendicular directions. In this case, the PEEK fibers are also arranged in both perpendicular directions.

Next, the second thermoplastic composite fabric of the present invention will be explained. As in the above first embodiment, the reinforcing fibers will be exemplified by carbon fibers, and the thermoplastic resin will be exemplified by PEEK.

Figure 2:
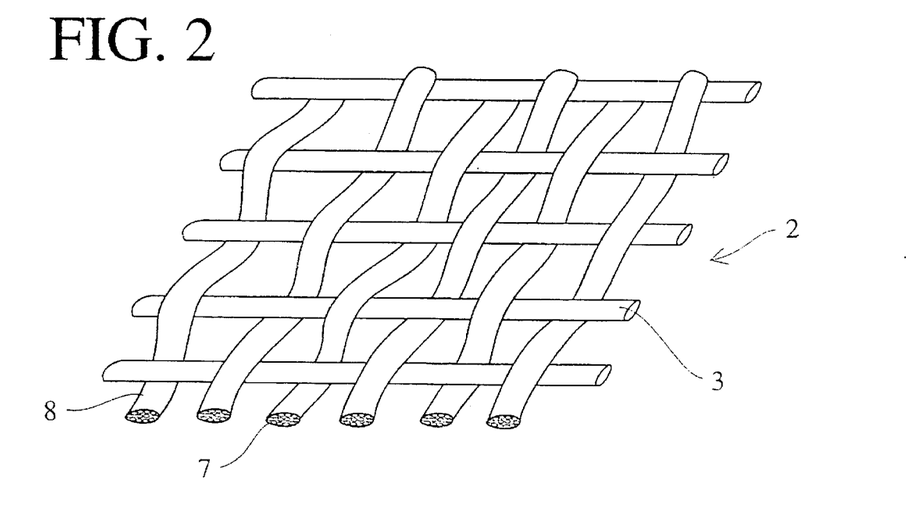
FIG. 2 is an enlarged schematic perspective view showing the second thermoplastic composite fabric according to the present invention.

FIG. 2 is an enlarged schematic perspective view showing the thermoplastic composite fabric according to the second embodiment of the present invention. A composite fabric 2 comprises (a) carbon fibers 3 and (b) strands 8 obtained by twisting fibers 7 formed from a melt-blended resin consisting essentially of low-molecular weight PEEK and high-molecular weight PEEK.

In the fibers 7, the same low-molecular weight PEEK and the same high-molecular weight PEEK as those described above are used. Namely, the low-molecular weight PEEK preferably has a weight-average molecular weight of about $6.5\times10^4$ to about $8.3\times10^4$, and the high-molecular weight PEEK preferably has a weight-average molecular weight of about $9.0\times10^4$ to about $9.4\times10^4$. In addition, the proportions of the low-molecular weight PEEK and the high-molecular weight PEEK may be the same as in the case of the first embodiment. Namely, the high-molecular weight PEEK preferably constitutes 75 weight % or less of the total amount of the PEEK.

The fibers 7 formed from a melt-blended resin consisting essentially, of low-molecular weight PEEK and high-molecular weight PEEK preferably have diameters of about 30–43 µm.

With respect to the form of the composite fabric 2 constituted by the PEEK fibers 7 and the carbon fibers 3, it is not restricted to a plain weave fabric, but may be any other types of fabrics such as satin, twill, etc. Also, in both first and second thermoplastic composite fabrics, a volume ratio of the thermoplastic fibers to the reinforcing fibers is preferably 50/50 to 40/60.

(2) Second Embodiment

The thermoplastic composite fabric according to the second embodiment comprises reinforcing fibers and a film of a thermoplastic resin. The reinforcing fibers and the thermoplastic resin per se may be the same as those in the first embodiment. In the case of PEEK, its weight-average molecular weight is preferably $6.5\times10^4$ to $9.4\times10^4$. The thermoplastic resin film preferably has a thickness of about 2.5–50 µm. A volume ratio of the thermoplastic film to the reinforcing fibers is preferably 50/50 to 40/60.

(3) Third Embodiment

The thermoplastic composite fabric according to the third embodiment comprises reinforcing fibers and thermoplastic resin powder. The reinforcing fibers and the thermoplastic resin per se may be the same as those in the second embodiment. The thermoplastic resin powder preferably has an average diameter of about 50–400 µm. A volume ratio of the thermoplastic resin powder to the reinforcing fibers is preferably 50/50 to 40/60.

(4) Fourth Embodiment

The thermoplastic composite fabric according to the fourth embodiment comprises reinforcing fibers impregnated with a thermoplastic resin. This type of the thermoplastic composite fabric may be called "prepreg." The reinforcing fibers and the thermoplastic resin per se may be the same as those in the second embodiment. A volume ratio of the thermoplastic resin to the reinforcing fibers is preferably 50/50 to 40/60.

[2] Thermoplastic Composite Member

The thermoplastic composite member of the present invention is produced by laminating the above thermoplastic composite fabrics and heating the resulting laminate under pressure. The laminate can be formed from either one of the thermoplastic composite fabrics 1 and 2 as shown in FIGS. 1 and 2, or can be formed from a combination of the thermoplastic composite fabrics 1 and 2. Further, the thermoplastic composite fabrics 1 and/or the thermoplastic composite fabrics 2 may be laminated with fabrics or nonwoven fabrics consisting only of PEEK fibers. The PEEK fibers may be combined with the carbon fibers in a proper proportion.

In the laminate of the thermoplastic composite fabrics, the carbon fibers as reinforcing fibers may be arranged only in one direction [unidirectional (UD)] or may be arranged in a plurality of directions.

The laminate of the thermoplastic composite fabrics is heated under pressure. The pressure applied to the laminate is preferably 6–20 kg/cm². The heating of the laminate should be conducted at such a high temperature that the PEEK resin is melted and penetrates into the reinforcing fibers. Specifically, the heating temperature is preferably 360°–400° C. By heating under such conditions, the laminate can be formed into a desired shape.

By heating, the PEEK fibers in the laminated composite fabrics are melted and penetrate into the reinforcing fibers, whereby the reinforcing fibers are integrally formed with the PEEK resin. The resulting formed article is cooled to obtain a thermoplastic composite member of the desired shape.

When other thermoplastic resins than PEEK are used for thermoplastic composite members, heating and pressure conditions in the production of formed articles should be adjusted depending on the types of the thermoplastic resins used.

[3] Assembly of Bagging Film and Seal Member

Figure 3:
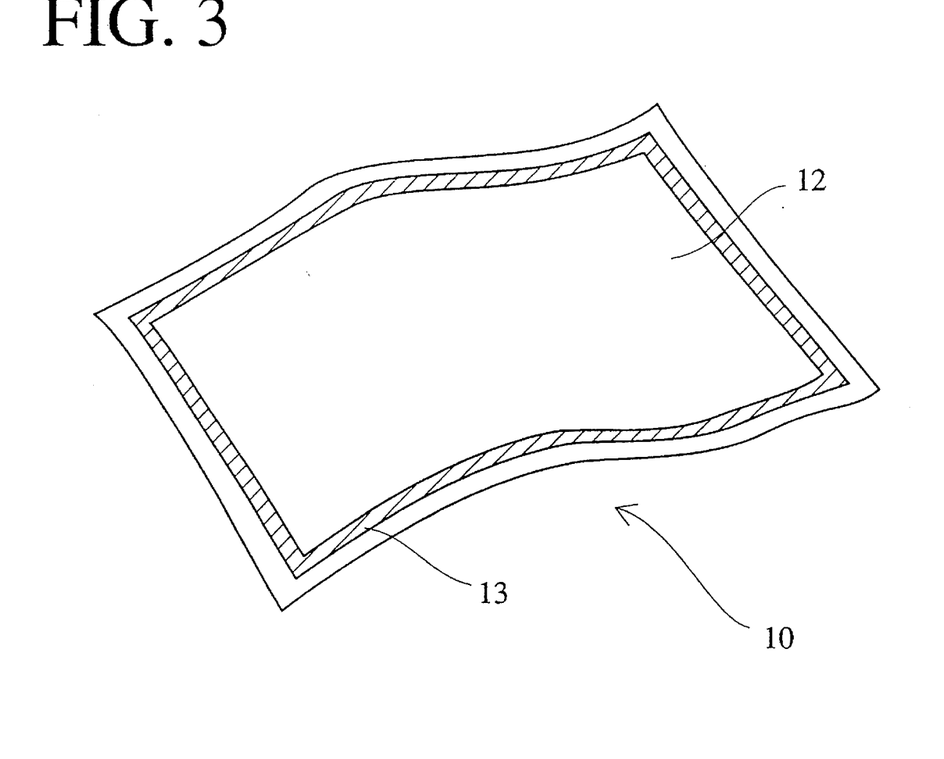
FIG. 3 is a plan view showing tile assembly of a bagging film for high-temperature forming of a thermoplastic composite member and a seal member according to the present invention.
Figure 4:
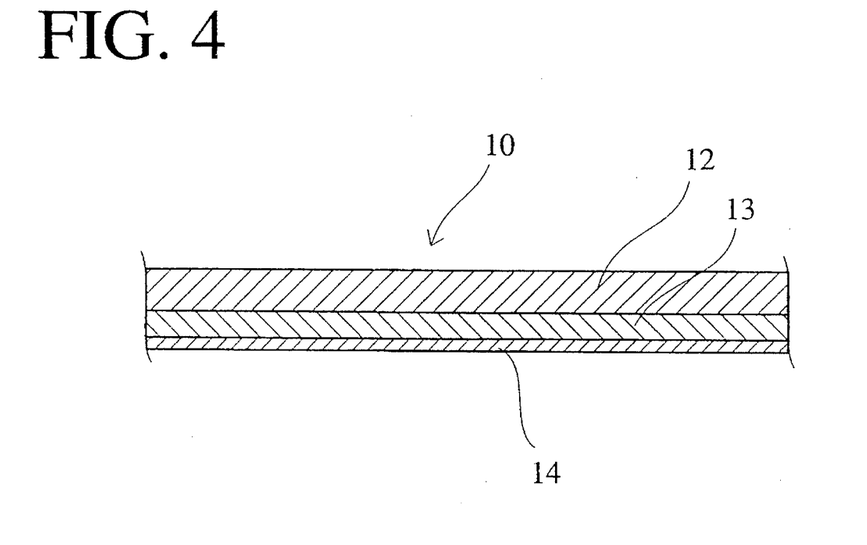
FIG. 4 is a cross-sectional view showing the assembly of a bagging film for high-temperature forming of a thermoplastic composite member and a seal member according to the present invention.

FIG. 3 shows one example of the assembly of the bagging film and the seal member. The assembly 10 comprises a heat-resistant bagging film 12 and a seal member 13 adhered to a periphery of the bagging film 12. FIG. 4 shows a cross-section of this assembly 10. The seal member 13 adhered to a surface of the bagging film 12 is covered with a parting sheet 14.

In such an assembly 10, the bagging film 12 is not restricted to a particular material as long as it can withstand a high-temperature forming at 250° C. or higher. The bagging film 12 may be formed by a film made of polyimides, polyamides, polyesters, etc. The thickness of the heat-resistant bagging film 12 is preferably 25–50 μm.

The seal member 13 may be made of silicone rubbers, epoxy resins, urethane resins, etc., which should meet the heat resistance requirement of 250° C. or higher. Such a seal member is preferably in the form of a sheet or a tape.

The parting sheet 4 is not particularly restrictive, and papers and various thermoplastic resin films may be used. Before bagging, the parting sheet 14 is removed so that the seal member 13 can be adhered to the base plate 21.

The assembly 10 of the bagging, film 12 and the seal member 13 is produced by the following method:

Since the heat-resistant seal member 13 shows little adhesion property at a room temperature, a sufficient energy should be applied to the heat-resistant seal member 13 while compressing it onto the bagging film 17 An energy applying means may be electric heating, impulse, high-frequency vibration, ultrasonic vibration, electromagnetic induction, infrared irradiation, etc., and welding by the ultrasonic vibration is preferable.

Figure 5:
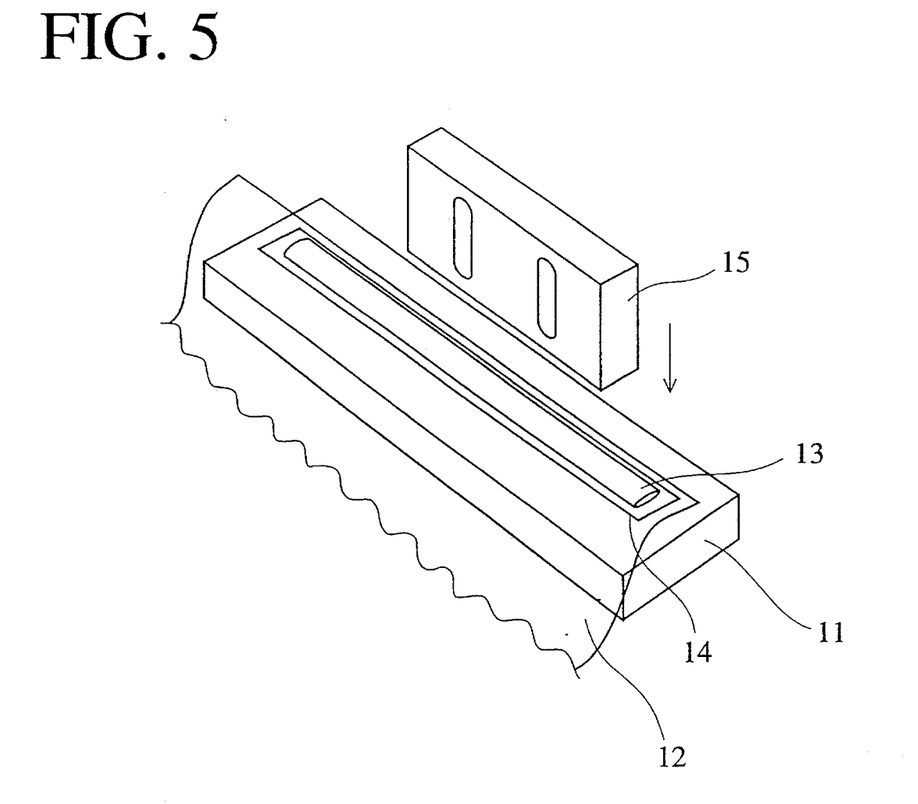
FIG. 5 is a schematic view showing the process of adhering the seal member to tile bagging film for high-temperature forming of a thermoplastic composite member.

As shown in FIG. 5, the ultrasonic welding may be conducted by placing a seal member 13 on a metal base 11 via a parting sheet 14, laying a heat-resistant bagging film 12 on the seal member 13 such that the seal member 13 is adhered to a periphery of the bagging film 12, and then pressing a horn 15 of an ultrasonic welding machine onto the bagging film 12 in order to adhere the bagging film 12 to the seal member 13. In this case, the pressure at which the heat-resistant bagging film 19 is compressed onto the heat-resistant seal member 13 is preferably about 0.5–2.0 kg/cm².

By using the assembly 10 of the heat-resistant bagging film 12 and the seal member 13 according to the present invention, vacuum leak is not likely to lake place in the process of bagging. Accordingly, the uniform bonding of the thermoplastic composite fabrics in the laminate can be achieved. Also, the covering of the laminate with the bagging film can be efficiently conducted.

[4] Preform

Figure 7:
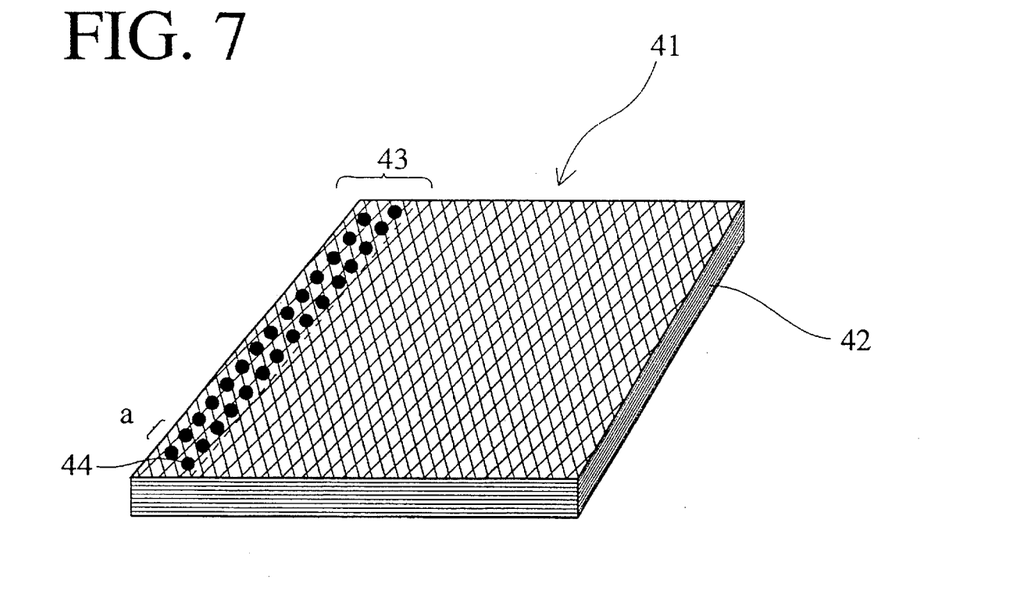
FIG. 7 is a perspective view showing the preform composed of the thermoplastic composite fabrics according to the present invention.

FIG. 7 shows the preform according to the present invention. The preform 41 comprises a plurality of sheet-like, thermoplastic composite fabrics 42, which are bonded to each other in edge portions 43. In the embodiment shown in FIG. 7, the bonding of the thermoplastic composite fabrics 42 is conducted by spot ultrasonic welding. The ultrasonic welding spot 44 is arranged at a pitch "a."

Figure 9:
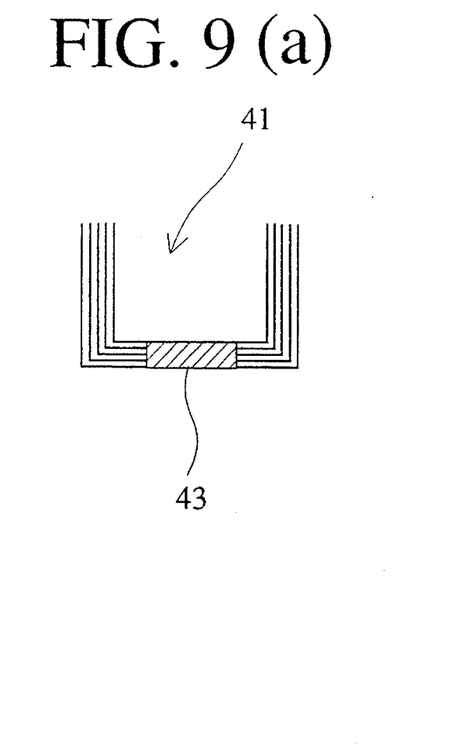
FIGS. 9(a), 9(b) and 9(c) are a schematic view showing the preforms according to other embodiments.

Incidentally, the bonding of the thermoplastic composite fabrics 42 is not necessarily in the edge portions 43, and it may be in any portions where the sheen-like, thermoplastic composite fabrics 42 are not bent. Some examples of bonding of the sheet-like, thermoplastic composite fabrics are shown in FIGS. 9 (a)–(c).

The number of the sheet-like, thermoplastic composite fabrics in the laminate is preferably 2–50.

Figure 8:
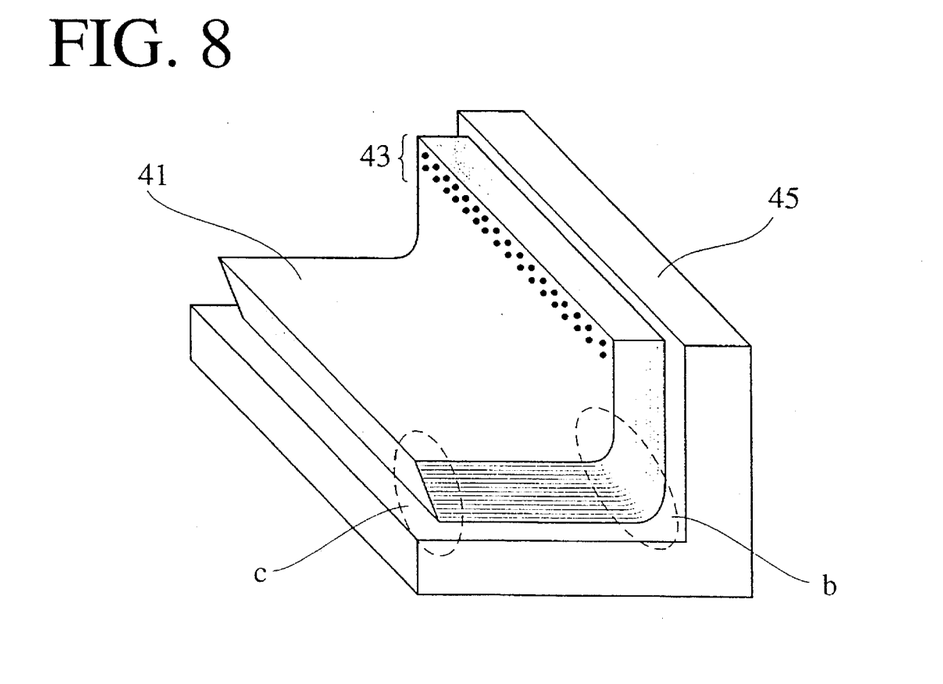
FIG. 8 is a perspective view showing the preform composed of the thermoplastic composite fabrics, which is formed along a mold.

The preform thus bonded partially is placed on a mold. FIG. 8 shows one example of such a mold, which is an L-shaped mold 45. In this case, it is preferable that the spot-bonded portions 43 are located in an uppermost area. Since this laminate is bonded in its edge portion, each sheen-like, thermoplastic composite fabric does not peel off, and no wrinkle or folding does not appear in a bent portion "b" shown in FIG. 8 because of relative sliding of sheet-like, thermoplastic composite fabrics. Accompanied with the sliding of sheet-like, thermoplastic composite fabrics, the other edge of the laminate is slanted as shown by "c." This slanted edge portion may be cut off after completion of forming.

The preform of the present invention is produced by the following method:

Each sheet-like, thermoplastic composite fabric is laminated on a flat surface and then partially bonded particularly in an edge portion. The bonding of the sheets is preferably conducted by spot ultrasonic welding, spot laser welding, spot welding with a healed trowel, stitching, heat press, etc. Among them the spot ultrasonic welding is most preferable.

The welding pitch "a" is preferably about 25–100 mm. When the welding pitch exceeds about 100 mm, sufficient bonding strength cannot be obtained. On the other hand, even when the welding pitch is less than about 25 mm, further improvement of bonding strength in the same bonding area cannot be achieved and bonding efficiency is lowered.

The resulting preform is then pressed to a mold or a jig at a proper pressure such that it is properly bent without wrinkles. In this state, the preform can be subjected to bagging as mentioned above.

[5] Integrally Formed Article

Figure 10:
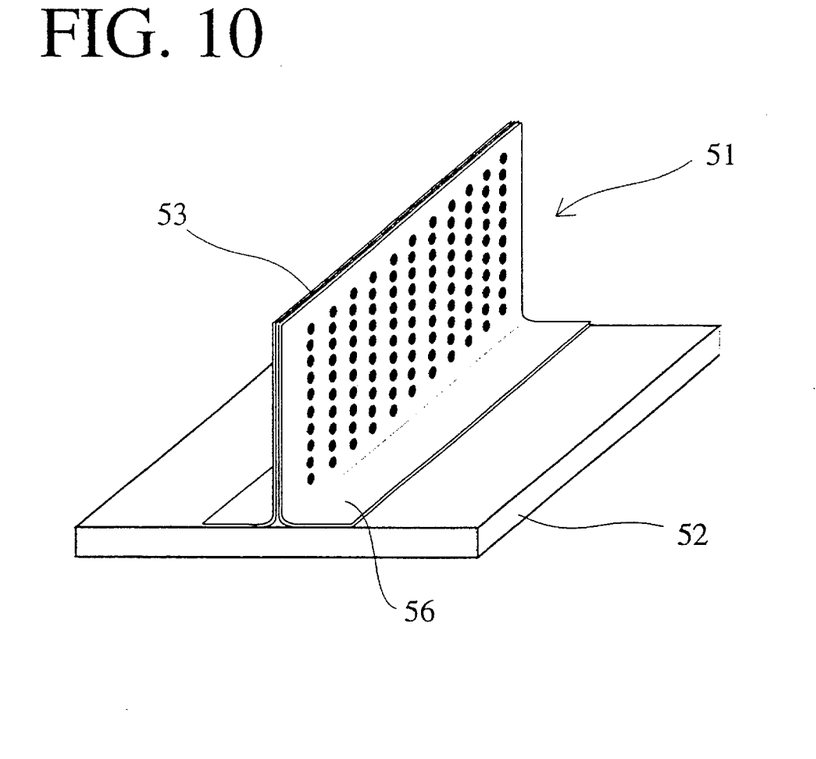
FIG. 10 is a perspective view showing one example of a preform for the formed article according to the present invention.

Referring to FIG. 10, an integral preform 51 has a first member 52 which is a preformed laminate of a plurality of thermoplastic composite fabrics comprising reinforcing fibers and a thermoplastic resin, and a second member 53 which is a partially bonded laminate of a plurality of thermoplastic composite fabrics comprising reinforcing fibers and a thermoplastic resin. The thermoplastic resin in the first and second members 52, 53 may be the same as described above.

The first member 52 may be produced by heating a laminate of a plurality of thermoplastic composite fabrics each comprising the reinforcing fibers and the thermoplastic resin at a temperature higher than the melting point of the thermoplastic resin by 30°–60° C. under pressure of 3–20 kg/cm² for 10–20 minutes particularly in the case of PEEK, the heating temperature is preferably 360°–400° C., particularly 370°–400° C. and the pressure is preferably 4–20 kg/cm².

Figure 11:
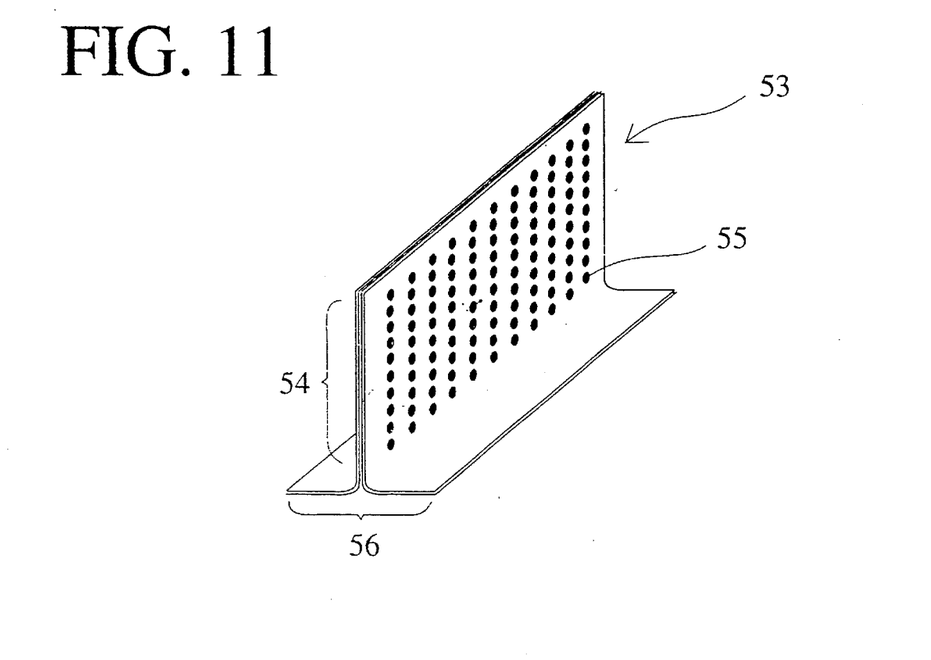
FIG. 11 is a perspective view showing the second member for the formed article according to the present invention.

The second member 53 is shown in FIG. 11. The second member 53 is constituted by a laminate consisting essentially of a plurality of sheet-like, thermoplastic composite fabrics (4 plies in this example) bonded to each other in a bonding portion 54. The reinforcing fibers and the thermoplastic resin used in the second member 53 may be the same as in the first member 52. In the bonding portion 54, the composite fabrics are bonded at a plurality of spots 55 positioned at a constant pitch. The spot bonding of the second member 53 is preferably conducted by spot ultrasonic welding on a flat plate other available bonding methods are laser welding, welding with a heated trowel, stitching, or heat press, etc.

The integrally formed article of the present invention is produced from the above first and second members 52, 53 as follows:

First, as shown in FIG. 10, the opened portions 56 of the second member 53 are abutted onto the first member 52 and introduced into a bagging film. In the process of bagging, the abutted first and second members 52, 53 are heated at a temperature lower than the melting point of the thermoplastic resin by about 40°–100° C., and under proper pressure. Specifically, in the case of using PEEK (melting point: 343° C.) as a thermoplastic resin, the heating temperature is lower than 343° C., particularly about 50°–300° C., and the pressure is preferably at least 1 kg/cm². When the heating temperature exceeds the melting point of the thermoplastic resin, the first member 52 and the second member 53 are melted in the abutted portions, making it difficult to eliminate the gap portion "g." If the pressure is lower than 1 kg/cm², a gap may remain between the first member 52 and the opened portions 56 of the second member 53.

Figure 12:
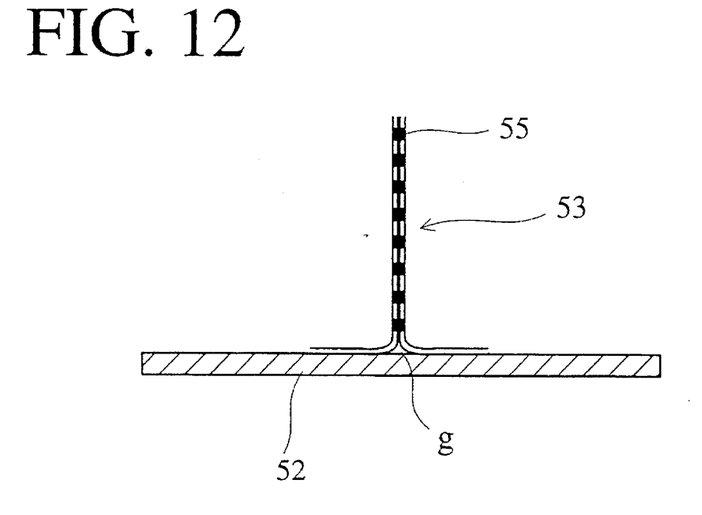
FIG. 12 is a cross-sectional view showing the preform being bonded according to the method of the present invention.

By heating the assembly of the first member 52 and the second member 53 at a temperature lower than the melting point of the thermoplastic resin under proper pressure, each sheet-like, thermoplastic composite fabric in the second member 53 can slide in a portion abutting the first member 52. Accordingly, as shown in FIG. 12, the gap portion "g" of the second member 53 at a root of the opened portions decreases, making it sure for both members to be brought into close contact with each other. In addition, since the second member 53 is not fused to the first member 52 in abutting portions in this stage, each thermoplastic composite fabric can slide in the second member 53. This serves to eliminate wrinkles, folds, etc., which would exist if the second member 53 is firmly bonded to the first member 52 in this first forming step. Evacuating the air from the bagging film further makes closer the contact of the second member 53 with the first member 52.

Next, the assembled first and second members 52, 53 are heated at a temperature equal to or higher than a melting point of the thermoplastic resin under pressure. The heating temperature is preferably higher than the melting point of the thermoplastic resin by 30°–60° C., and specifically in the case of PEEK, it is preferably 360°–400° C., particularly 390°–400° C. Also, the pressure is preferably 3–20 kg/cm², particularly 14–20 kg/cm² in the case of PEEK By health,, at this temperature the reinforcing fibers are sufficiently impregnated with the thermoplastic resin.

The thermoplastic composite member thus obtained is free from wrinkles, folds, blisters, etc. in the bonding portion as a result, there are no resin-rich portions nor voids into which reinforcing fibers may enter in the formed article.

Besides the above T-shaped article shown in FIGS. 10–12, the formed article of the present invention may have any other shapes such as H shape, etc. In the case of the H-shaped article, both end portions of the second member are split and opened and abutted to the two first members. Also, one first member may be bonded to a plurality of second members. Depending on desired shapes, various combinations of the first members and the second members may be utilized.

The present invention will be explained in further detain by the following Examples without intention of restricting the scope of the present invention.

EXAMPLES 1 AND 2

Low-molecular weight PEEK fibers made of PEEK (PEEK 150 G available from ICI) having a weight-average molecular weight of $7.4 \times 10^4$ (determined relative to the molecular weight of polystyrene as a reference) and having an average diameter of 33 µm and high-molecular weight PEEK fibers made of PEEK (PEEK 450 G available from ICI) having a weight-average molecular weight of $9.2 \times 10^4$ and having an average diameter of 40 µm were combined to form twisted strands, and the twisted strands were woven with long carbon fibers having an average diameter of 7 µm in the form of a plain weave fabric as shown in FIG. 1. A weight ratio of the low-molecular weight PEEK to the high-molecular weight PEEK was 1:1 in Example 1, and 3:1 in Example 2.

40 thermoplastic composite fabrics were laminated to form a substantially isotropic laminate. The laminate was introduced into a bag of a polyimide film, and placed in an autoclave where it was heated at 400° C. under 14 kg/cm². After cooling, a formed article (thermoplastic composite member) was obtained.

The resulting thermoplastic composite member was cut to provide specimens of 100 mm×100 mm, in order to measure compression-after-impact strength (CAI strength) according to a NASA method, which comprised adding an impact energy of 26.7 J to each specimen and then compressing the erected specimen in a vertical direction to determine a strength at which the specimen was broken. The measurement results of compression-after-impact strength (CAI strength) are shown in Table 1.

EXAMPLES 3 AND 4

PEEK (PEEK 150 G available from ICI) having a weight-average molecular weight of $7.4 \times 10^4$ (determined relative to the molecular weight of polystyrene as a reference), and PEEK (PEEK 450 G available from ICI) having a weight-average molecular weight of $9.2 \times 10^4$ were melt-blended in predetermined proportions, and the blended resin was melt-spun to form PEEK fibers having an average diameter of 38 µm. Twisted strands formed from these PEEK fibers and carbon fibers were woven to form a plain weave fabric as shown in FIG. 2. A weight ratio of the low-molecular weight PEEK to the high-molecular weight PEEK was 1:1 in Example 3, and 3:1 in Example 4.

40 thermoplastic composite fabrics were laminated to form a substantially isotropic laminate, and the laminate was formed into a thermoplastic composite member in the same manner as in Example 1. With respect to each thermoplastic composite member, the compression-after-impact strength (CAI strength) was measured in the same manner as in Example 1. The results are shown in Table 1.

COMPARATIVE EXAMPLE 1

40 thermoplastic composite fabrics consisting essentially of the same low-molecular weight PEEK fibers and the same carbon fibers as used in Example 1 were laminated and formed into a thermoplastic composite member in the same manner as in Example 1. With respect to each thermoplastic composite member, the compression-after-impact strength (CAI strength) was measured in the same manner as in Example 1. The results are shown in Table 1.

TABLE 1

| Example No. | Low-MW PEEK/ High-MW PEEK* | Carbon Fibers (vol %)** | CAI Strength (kg/cm$^2$) |
| --- | --- | --- | --- |
| 1 | 1:1 | 61 | 37.2 |
| 2 | 3:1 | 61 | 35.3 |
| 3 | 1:1 | 61 | 35.1 |
| 4 | 3:1 | 61 | 31.4 |
| 1*** | low-MW PEEK only | 61 | 28.6 |

Note:
*Weight ratio.
**Volume fraction of carbon fibers in the thermoplastic composite member.

***Comparative Example.

As is clear from the above, the thermoplastic composite fabrics of the present invention show higher CAI strength than that of Comparative Example.

EXAMPLE 5

34 plain weave fabrics of 8 cm×30 cm consisting essentially of carbon fibers having an average diameter of 7 μm and PEEK fibers having an average diameter of 40 μm were laminated and heated at 380° C. under 5 kg/cm$^2$ for 15 minutes to prepare a first member.

4 plain weave fabrics of 23 cm×30 cm consisting essentially of the same carbon fibers and the same PEEK fibers as above were laminated and spot-welded by ultrasonic vibration except for both 4-cm-wide end portions to prepare a second member. The ultrasonic welding was conducted by using ultrasonic vibration having a frequency of 15 kHz generated from a horn having a diameter of 10 mm for 1 second under pressure of 10 kg/cm$^2$. After the ultrasonic welding, the second member was cooled for 6 seconds.

Figure 13:
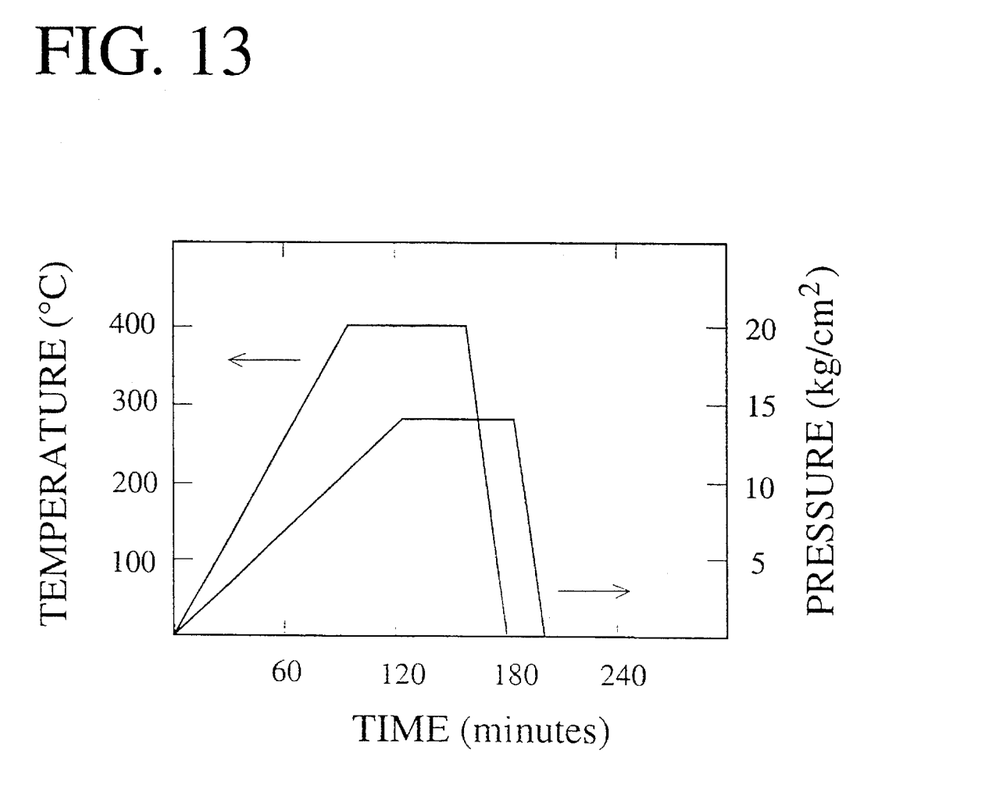
FIG. 13 is a graph showing the heating and pressing process in Example 5.

One second member thus produced was opened in both end portions to a T shape, and abutted to two first members. The resulting assembly was introduced into a bagging film made of polyimide, and then heated while compressing at temperature and pressure patterns shown in FIG. 13.

The resulting formed article was observed with respect to wrinkles, blisters, voids, resin-rich portions and displacement of reinforcing fibers. As a result, these defects were not observed in the formed article.

Since the thermoplastic composite fabric of the present invention contains both low-molecular weight PEEK and high-molecular weight PEEK in addition to reinforcing fibers such as carbon fibers, good impregnation of the reinforcing fibers with PEEK can be achieved, and the resulting thermoplastic composite member is provided with greatly improved toughness by the existence of the high-molecular weight PEEK.

Also by conducting the forming of the laminate of the thermoplastic composite fabrics in the bagging film having a seal member adhered to its periphery according to the present invention, leak is not likely to take place in the process of bagging, and the bagging operation is greatly made easier.

When the laminate of sheet-like, thermoplastic composite fabrics is bonded in a restricted portion, for instance, in an edge portion, bending of the laminate can be easily conducted without wrinkles, because each sheet-like, thermoplastic composite fabric can freely slide in the laminate being bent. Thus, high-quality bent articles without wrinkles and folds can be easily produced from such bent laminates by heating them in the bagging film. The formed articles may be in any shape such as L shape, T shape, H shape, U shape, I shape, etc. Since such formed articles have good mechanical strength, they can be used for various machine parts such as automobile parts, structural members, etc.

What is claimed is:

1. A method of producing an integrally formed article of thermoplastic composite members, comprising the steps of:

(a) forming a preformed first member by laminating a plurality of thermoplastic composite fabrics comprising reinforcing fibers and a thermoplastic resin and applying pressure to the resulting laminate to form it into a predetermined shape while heating it at a temperature equal to or higher than a melting point of said thermoplastic resin;

(b) forming a second member by laminating a plurality of thermoplastic composite fabrics comprising reinforcing fibers and a thermoplastic resin and partially bonding said thermoplastic composite fabrics;

(c) bending a non-bonded portion of said second member;

(d) abutting and pressing the non-bonded portion of said second member to said first member while heating said first and second members at a temperature lower than the melting point of said thermoplastic resin; and (e) heating the resulting assembly at a temperature equal to or higher than a melting point of said thermoplastic resin under pressure.

* * * * *